Figure 1:
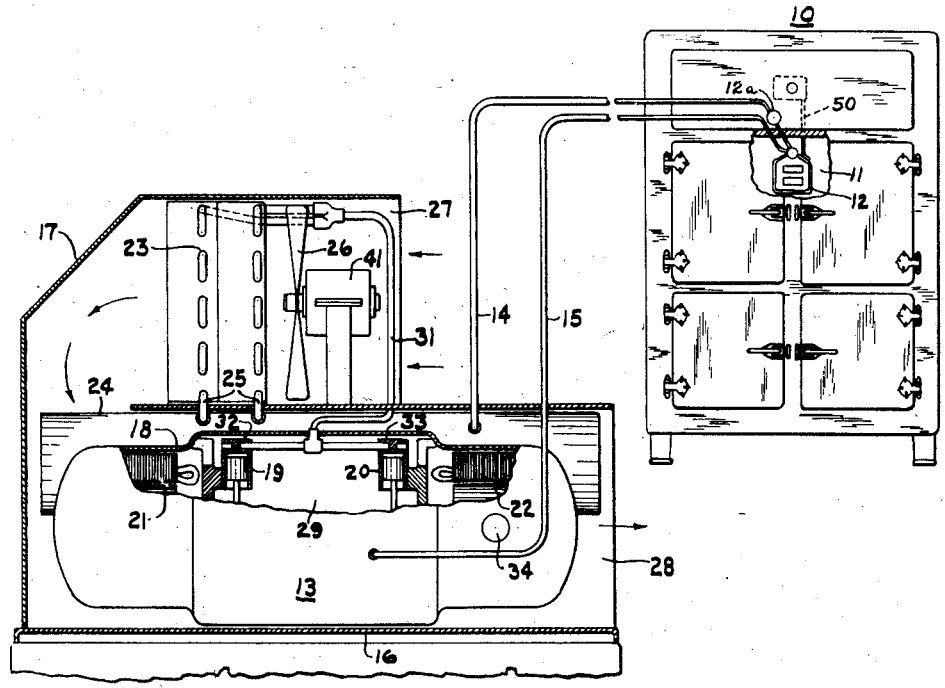

April 10, 1934.  W. B. ANDERSON  1,953,941

REFRIGERATOR CONTROL

Filed April 16, 1932

WITNESSES:

BY

INVENTOR
WILLIAM B. ANDERSON

ATTORNEY

Patented Apr. 10, 1934

1,953,941

UNITED STATES PATENT OFFICE 1,953,941

REFRIGERATOR CONTROL

William B. Anderson, Springfield, Mass., assignor to Westinghouse Electric & Manufacturing Company, a corporation of Pennsylvania Application April 16, 1932, Serial No. 605,742

12 Claims. (Cl. 62—4)

My invention relates to refrigerating apparatus employing a plurality of motor driven compressor units and it has for an object to provide an improved control for the same.

A refrigerating machine having units operating in parallel is advantageous in that it can be operated with lower maximum current demands than a machine having a single motor of twice the capacity of one of the paralleled motors. This is accomplished by sequentially starting the motors; the interval between the starting of the motors being timed to permit the first motor to attain full speed, with corresponding running current before the second motor is started. It will be apparent that the maximum current demand will be incidental to the starting of the second motor, which current would be the sum of the starting current of the succeeding motor and the running current of the preceeding motor. A motor of double the capacity of one of the motors in parallel would also have a starting current that would be approximately double, and substantially higher than the maximum current demand of the two smaller motors starting in sequence.

It is a further object of my invention, therefore, to provide control apparatus that will reduce the maximum current demand by starting the compressor motors in sequence.

In my copending application Serial No. 636,393, filed October 5, 1932, and assigned to the Westinghouse Electric and Manufacturing Company, there is disclosed and claimed a refrigerating machine which includes two motor driven compressor units operating in parallel. The use of a machine of the character disclosed in this copending application would be found in large household and commercial refrigerators. In this field, my novel control would be particularly applicable, as apparatus used therein would be operated from electric circuits of limited capacity, for example, lighting circuits of residences and stores. The fusing of such circuits is limited by ordinance or fire underwriter rules and apparatus operated thereon would necessarily have to operate with maximum current demands below the fusing of the circuit. Otherwise, a circuit for the machine must be provided with larger or additional lines from the power source, incurring additional installation expense.

In one form of my invention, I provide a master switch, for connecting the first motor to a power source for starting. An electro-responsive device is connected in series with the first motor and operatively connected to a switch in the circuit of the second motor. During starting of the first motor, the electro-responsive device holds the switch of the second motor open until the first motor has attained full speed at which time the current of the first motor drops to normal running value. The electro-responsive device then closes the switch connecting the second motor to the power source. Both motors then operate as long as the master switch remains closed. When the master switch operates to open the circuit, both motors may be simultaneously disconnected from the power source and stop operating until the master switch again closes.

Figure 2:
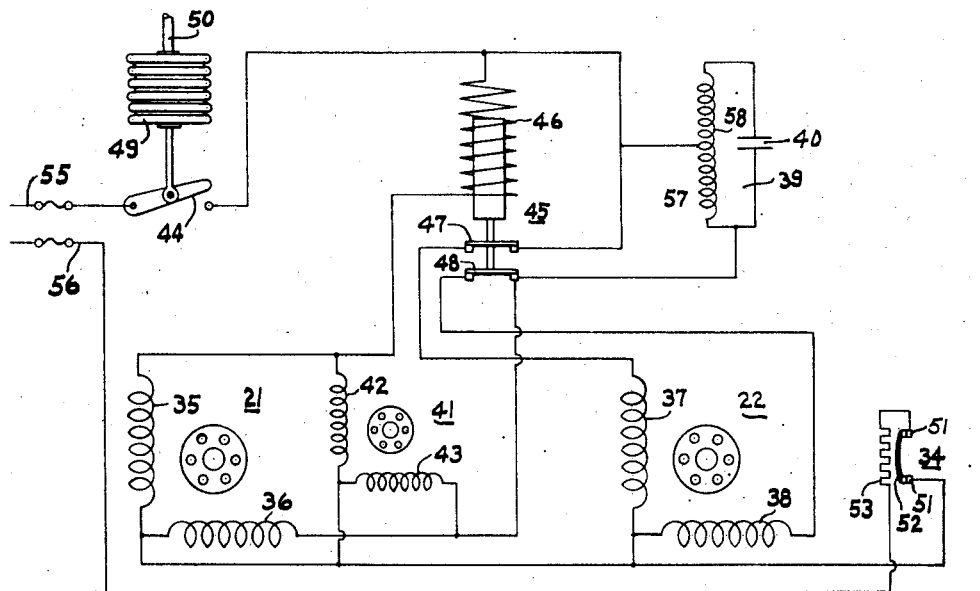

These and other objects are effected by my invention, as will be apparent from the following description and claims, taken in connection with the accompanying drawing, forming a part of this application in which:

Fig. 1 is a view of refrigeration apparatus including a plurality of motor driven compressors; and Fig. 2 is a diagrammatic view showing the electrical connections for my novel control.

Referring to Fig. 1 of the drawing, I have illustrated refrigerating apparatus including a refrigerator 10, having a cooling compartment 11 in heat exchange relation with an evaporator 12, and a machine 13 (drawn to larger scale) for circulating a volatile refrigerant, for example, sulphur dioxide. Conduits 14 and 15 connect the evaporator 12 with the refrigerating machine 13 and form a part of the refrigerant circuit.

The machine 13 is mounted on a base 16 and may be enclosed in a housing structure 17. It comprises a casing 18 having compressors 19 and 20 longitudinally spaced therein and driven by motors 21 and 22, respectively. A condenser 23 and a receiver 24 are carried by the housing structure 17 and are connected by conduits 25. Cooling air supplied by a fan 26 enters the housing 17 through an inlet 27 and is discharged through an outlet 28, the air passing through the condenser 23 and over the casing 18. During this passage, heat is abstracted from the condenser 23 and from the casing 18.

The apparatus operates on the well known compression expansion cycle. Refrigerant vapor is withdrawn from the space 29 in the casing 18 by the compressors 19 and 20 and conveyed under pressure through a conduit 31 to the condenser 23 where it is condensed. The liquid refrigerant then passes from the condenser 23 to the receiving tank 24 from which it is conveyed by the conduit 14 to the evaporator 12. Before entry into the evaporator, the refrigerant passes through a suitable expansion valve shown at 12a. The pressure is relatively low in the evaporator 12 and vaporization of the liquid refrigerant takes place, abstracting heat from the cooling compartment 11 in a well known manner. The vaporized refrigerant is withdrawn from the evaporator 12 through conduit 15 to the space 29 by the suction of the compressors 19 and 20, the inlets 32 and 33 of which communicate with the space 29. This vapor is then again compressed and the cycle of operation repeated.

A portion of the heat developed by the motors 21 and 22 and the compressors 19 and 20 is conducted to the casing 18. The air circulated by the fan 26, after leaving the condenser, passes over the casing 18 from which it abstracts heat. It will be apparent that the air, when passing over motor 22, will be slightly warmer than when passing over motor 21, so that motor 22 operates at a slightly higher temperature than motor 21. A sentinel switch 34 responsive to thermal conditions is, therefore, fixed to the casing 18 adjacent motor 22 and connected to the electric circuit of the motors, as described later, to provide thermal protection not only for the motor 22 but the relatively cooler motor 21.

Referring to Fig. 2, I prefer to use single-phase motors of the capacitor type. The motor 21 has a main winding 35 and a capacitor winding 36. Similarly, motor 22 has main and capacitor windings 37 and 38, respectively. Phase difference between the main windings and the capacitor windings is provided by the reactive capacitance of a single capacitor unit 39 which is connected in circuit with the capacitor windings 36 and 38 in a well-known manner. The fan motor 41 operates in parallel with compressor motor 21, and has main and capacitor windings 42 and 43 in phase relation with the respective main and capacitor windings 35 and 36 of the compressor motor 21.

The capacitor unit 39 includes a condenser 40 having an autotransformer 58 connected across the same in a well-known manner to produce a relatively high voltage so that the required capacitive reactance of the unit 39 may be obtained with a relatively small condenser 40.

The other elements of my novel control include a master switch 44 and a relay 45 having an operating coil 46 and switches 47 and 48. The relay 45 will operate to open the switches 47 and 48 when the current in the coil 46 is in excess of a predetermined value, for example, the normal running current of the motor 21. When the current in the coil 46 drops to said running current value, the relay 45 operates to close the switches 47 and 48. The master switch 44 may be operated in any suitable manner, for example, by a temperature responsive means such as an operating bellows 49 and a tube 50 extending within the cooling compartment 11 of the refrigerator 10. An expansible fluid is contained within the bellows 49 and tube 50, the pressure of which varies with the temperature of the cooling compartment.

It is desirable with refrigerating apparatus of this character to provide some form of overload protection. To this end, I provide the sentinel switch 34 fixed to the casing 18 adjacent motor 22 and including contacts 51 and a bowed bimetal bridging disc 52. A heating coil 53 is in series with the contacts 51 and adjacent the bimetal disc 52. The bimetal disc 52 when heated to a predetermined temperature will flex in a direction away from the contacts 51 and open the circuit. The bimetal disc 52 may be heated to effect deflection thereof by either or both of two ways, first, by excessive current draw in the circuit which will increase the temperature of the heating coil 53 and, second, by the hermetically-sealed casing 18 assuming an excessive temperature whereupon the heat of the casing will effect deflection of the disc 52. An important advantage of my safety control apparatus is that, as soon as the operating condition returns to normal, the switch 34 automatically closes, no manual manipulation or adjustment being necessary. As the switch 34 is carried adjacent the motor 22 which operates at a slightly higher temperature than motor 21 as heretofore described, thermal protection will be afforded both motors. Overload protection is provided by the heating effect of the coil 53 acting on the disc 52 which coil 53 conducts the current of both motors 21 and 22.

The operation of my novel control is as follows: When the refrigerating machine is inactive, the control circuit is in the position shown in Fig. 2, with the master switch 44 open and the relay contact switches 47 and 48 in closed position. When the temperature of the cooling compartment rises to a predetermined degree, the increasing pressure within the bellows 49 expands the same sufficiently to close the master switch 44. A circuit is formed from the power source through line conductor 55, master switch 44, the coil 46 of the relay 45, main winding 35, and thermostat 34 to the opposite line conductor 56. The energizing of the coil 46 causes the relay to operate to open both switches 47 and 48 preventing current from flowing to motor 22. Current also flows from the master switch 44 through a portion 57 of the autotransformer winding 58 to the capacitor winding 36 and through the thermostat 34 to the line conductor 56, whereupon the motor 21 begins operation. The relay 45 is of the quick-acting type and operates rapidly enough to prevent full starting current building up in the motor 22.

When the motor 21 reaches full speed with the corresponding normal or decreased running current, the relay 45 operates to close switches 47 and 48 thereby placing motor 22 in parallel with motor 21. The circuit through the main winding 37 is completed with the closing of switch 47 and of the capacitor winding 38 through switch 48. Both motors 21 and 22 continue to operate until the temperature in the cooling compartment 11 drops to a predetermined degree when the bellows 49 contracts and opens the master switch 44, disconnecting both motors from the power source. At such a time, the apparatus again assumes the position shown in Fig. 2. The fan motor 41 may be connected directly in parallel with motor 21 so that it will start and stop therewith.

It will be seen from the foregoing that I have devised a control that provides for sequential or staggered starting of the compressor motors 21 and 22 to reduce the maximum starting current demands.

It will be apparent that the maximum current demand of the motors will be incidental to the closing of the switches 47 and 48 to start the second motor. This current demand will be the sum of the normal running current of motor 21 and the starting current of motor 22. As the starting currents of the motors are several times greater than the running currents, it will be seen that the maximum current demand when sequentially started will be substantially less than the sum of the starting currents when started simultaneously.

While I have shown my invention applied to hermetically sealed motors, it will be understood that it is equally applicable for use with other types.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a control system for refrigerating apparatus, the combination of a refrigerant circuit including an evaporator, a cooling compartment in heat exchange relation with said evaporator, first and second compressors connected in parallel for circulating a refrigerant through said evaporator, first and second motors for driving said compressors respectively, and means responsive to the temperature of said cooling compartment for controlling the operation of said motors to provide sequential starting and simultaneous stopping of the same, said means including means responsive to the current in the first motor for subsequently energizing the second motor.

2. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors, respectively, a source of electrical energy, a circuit for connecting the motors to the source of electrical energy, a switch operated in response to a condition within said chamber for closing the circuit to the first motor, and means responsive to the flow of current through the first motor for subsequently closing the circuit to the second motor.

3. In a control system for intermittently operated refrigerating apparatus, the combination of a refrigerant circuit including an evaporator, a chamber in heat exchange relation with said evaporator, first and second compressors for circulating refrigerant through the evaporator, independent motors for driving the compressor, each of said motors requiring a greater supply of current during starting periods of operation than during subsequent normal running periods, a source of electrical energy, a circuit for connecting the motors to said electrical energy source, and a master switch operated in response to the temperature of said chamber and connected in the circuit between the source of energy and both motors, a second switch normally retained in closed position and connected in the circuit between the master switch and the second motor, and means responsive to the flow of current during the starting period of the first motor for retaining the second switch in open position.

4. In a control system for intermittently operated refrigerating apparatus, the combination of a refrigerant circuit including an evaporator, a chamber in heat exchange relation with said evaporator, first and second compressors for circulating refrigerant through the evaporator, independent motors for driving the compressors, each of said motors requiring a greater supply of current during starting periods of operation than during subsequent normal running periods, a source of electrical energy, a circuit for connecting the motors to said electrical energy source, a switch operated in response to a temperature condition within said chamber for closing the circuit to the first motor, and means effective at the termination of the starting period of the first motor for closing the circuit to the second motor.

5. In a control system for intermittently operated refrigerating apparatus, the combination of a refrigerant circuit including an evaporator, a chamber in heat exchange relation with said evaporator, first and second compressors for circulating refrigerant through the evaporator, independent motors for driving the compressor, a fan, a motor for driving the fan, a source of energy, a circuit for connecting the motors to the source of energy, and a switch operated in response to a condition within said chamber for closing the circuit to the first compressor motor and to the fan motor, and means responsive to the flow of current through the first compressor motor and the fan motor for subsequently closing the circuit to the second motor.

6. In a control system for intermittently operated refrigerating apparatus, the combination of a refrigerant circuit including an evaporator, a chamber in heat exchange relation with said evaporator, a plurality of compressors for circulating refrigerant through said evaporator, a motor for driving each compressor, means responsive to a condition within said chamber for controlling the supply of energy to each motor, and means responsive to the current in one motor for subsequently energizing the other motor, whereby sequential starting of the motors is obtained.

7. In a control system for intermittently operated refrigerating apparatus, the combination of a refrigerant circuit including an evaporator, a chamber in heat exchange relation with said evaporator, a plurality of compressors for circulating refrigerant through said evaporator, a plurality of electrical motors for driving said compressors, respectively, means responsive to the temperature of said chamber for controlling the supply of energy to said motors, and means responsive to the current in one motor for subsequently energizing another motor whereby sequential starting of the motors is obtained.

8. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors, respectively, means responsive to a condition within said chamber for controlling the supply of energy to said motors, and means responsive to the normal running current of the first motor for energizing the second motor, said control means being adapted to stop both motors simultaneously.

9. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors, respectively, a source of electrical energy, a circuit for connecting the motors to the source of electrical energy, a master switch operated in response to a temperature condition within said chamber and connected in the circuit between said source of energy and the motors, a second switch connected in the circuit between the master switch and the second motor, means responsive to the flow of current to the first motor for subsequently closing the second switch for supplying energy to the second motor, a sentinel switch connected in the circuit and normally disposed in closed position, and means responsive to the temperature of one of the motors or to the flow of current through the circuit for opening the sentinel switch.

10. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors, respectively, a source of electrical energy, a circuit for connecting the motors to the source of electrical energy, a master switch operative in response to the temperature in the chamber and connected in the circuit between said source of energy and the motors, a second switch connected in the circuit between the master switch and the second motor, means responsive to the flow of current through the first motor for subsequently closing the second switch for supplying energy to the second motor, a sentinel switch connected in the circuit and normally disposed in closed position, and means responsive to an abnormal temperature of one of the motors or to the abnormal flow of current through the circuit for temporarily retaining the sentinel switch in an open position, and for automatically closing the same when the aforesaid operating conditions have returned to normal.

11. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors, respectively, a fan for circulating air over the first compressor and its motor and thence over the second compressor and its motor, a motor for driving the fan, a source of electrical energy, a master switch operative in response to the temperature of said chamber for closing the circuit to the first compressor motor and to the fan motor, a second switch connected between the master switch and the second compressor motor, means responsive to the flow of current through the first compressor motor and the fan motor for actuating the second switch to control the supply of electrical energy to the second compressor motor, a sentinel switch normally retained in closed position and connected in the circuit, and means responsive to an abnormal thermal condition of the second compressor motor or to the flow of abnormal current through the circuit for opening the sentinel switch.

12. In a control system for intermittently operated refrigerating apparatus, the combination of a refrigerant circuit including an evaporator, a chamber in heat exchange relation with said evaporator, first and second compressors for circulating refrigerant through the evaporator, first and second motors for driving said compressors respectively, a source of electrical energy, a circuit for connecting the motors to the source of electrical energy, a switch for closing the circuit to the first motor, and means responsive to the flow of current through the first motor for subsequently closing the circuit to the second motor.

WILLIAM B. ANDERSON.